April 18, 1939.   L. D. MILLS ET AL   2,154,465
CYANIDATION PROCESS AND APPARATUS
Original Filed March 17, 1937
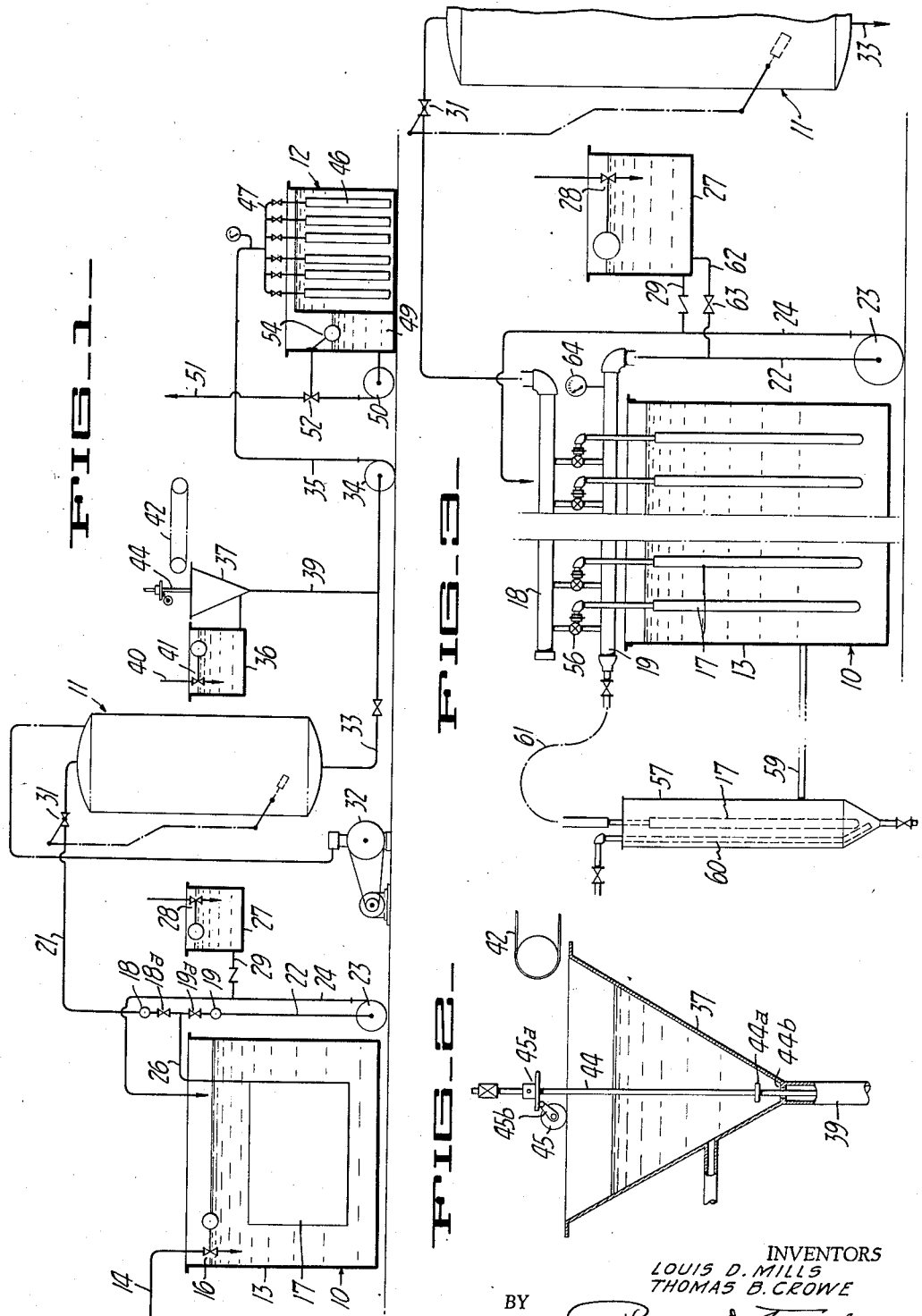
INVENTORS
LOUIS D. MILLS
THOMAS B. CROWE
BY
*Paul D. Flehr*
ATTORNEY.

Patented Apr. 18, 1939

2,154,465

UNITED STATES PATENT OFFICE 2,154,465

CYANIDATION PROCESS AND APPARATUS

Louis D. Mills and Thomas B. Crowe, Palo Alto, Calif., assignors to The Merrill Company, San Francisco, Calif., a corporation of California Application March 17, 1937, Serial No. 131,377. Renewed July 25, 1938. In Brazil March 3, 1937

8 Claims. (Cl. 266—12)

This invention relates generally to processes and apparatus for the treatment of alkaline cyanide solutions containing dissolved precious metal values. More specifically it relates to processes and apparatus of the type wherein a filter is utilized for the purpose of clarifying the solution immediately prior to deaeration and precipitation thereof.

It is an object of the invention to provide a process and apparatus of the above character which will make possible individual conditioning of the elements of a clarifying filter, with filter aids such as kieselguhr, without interrupting continued operation of the remaining elements.

Another object of the invention is to enable individual testing of the filter elements for leakage, without affecting or discontinuing the effluent flowing from other elements.

It is a further object of the invention to generally improve upon apparatus and processes of the above character, particularly with respect to the manner of supplying solution to the zinc emulsion cone, and with respect to means for effecting controlled removal of barren solution from the precipitating filter.

Referring to the drawing:

Fig. 1 is a diagrammatic flow sheet, illustrating one form of apparatus incorporating the invention.

Fig. 2 is a cross-sectional detail showing parts associated with the zinc cone.

Fig. 3 is a side elevational view showing a modification of the invention.

The apparatus as illustrated in Fig. 1 of the drawing includes generally a solution clarifying filter 10, a deaerating receiver 11, and a precipitating filter 12. The clarifying filter 10 consists of a solution tank 13, which receives the unclarified pregnant cyanide solution through the pipe line 14. Flow of solution through this line is controlled by a float valve 16 in order to maintain a substantially constant level of solution. Disposed within the tank 13 are the vacuum filter leaves 17, which are formed in a suitable manner, as for example they may consist of filter cloth envelopes, supported by a suitable frame.

Two manifolds 18 and 19 are provided for the classifying filter. Manifold 18 connects with the deaerating receiver 11, by pipe line 21. Manifold 19 is connected by pipe line 22, to the inlet side of a small solution pump 23, the discharge side of which is connected to the return pipe 24. The interiors of the several clarifying leaves 17 are connected to the individual pipes 26, and each of these pipes in turn connects with the valves 18a and 19a. These valves connect with manifolds 18 and 19, and afford operating positions as follows: With both valves (corresponding to a particular vacuum leaf) closed, communication with both manifolds is interrupted and the associated pipe 26 can be disconnected to enable removal of the filter leaf. With valve 19a closed and 18a open, the filter leaf is connected to the manifold 18, and thence to the pipe 21 and vacuum receiver 11. With valve 19a open and 18a closed, the pipe 26 is placed in communication only with the manifold 19, and the inlet side of pump 23.

Automatic priming means is desirable in conjunction with pump 23. A suitable arrangement is to provide a small supplemental tank 27, to which a supply of clear barren solution or like liquid is provided through the float operated valve 28. A gravity flow pipe connection 29 is established from tank 27 to the pump discharge pipe 24, and this pipe connection is provided with a check valve to prevent backflow of solution to tank 27. The liquid level maintained in tank 27 is above the level of manifold 19.

It is desirable to employ suitable means to maintain a relatively constant level of solution in deaerating receiver 11. Thus a valve 31 is shown interposed in the flow line 21, and this valve is indicated as being automatically operated by a suitable float within the deaerating receiver. A suitable vacuum pump 32 is shown for maintaining the deaerating receiver in proper evacuated condition during operation of the system.

The outflow line 33 from receiver 11, connects to the inflow side of a solution pump 34. The discharge flow line 35 leading from the pump 34 connects directly with the precipitating filter 12. Pump 34 is preferably of a type provided with a liquid seal against admittance of air, thus avoiding reabsorption of oxygen into the solution.

The precipitant, such as zinc dust, is shown being introduced into the pregnant solution on the inflow side of the pump 34. For the purpose of making up the zinc emulsion, there is shown a small steady head tank 36, which is connected by a gravity flow pipe to the zinc or emulsion cone 37. Pipe 39 connects to the lower end of this cone to the solution flow line 33. A suitable source of liquid, such as precipitated barren solution, is connected to the steady head tank by pipe line 40, and the solution level in the steady head tank and in the cone is automatically maintained by means of the float operated valve 41. A suitable zinc dust feeder 42, such as one of the endless belt type, serves to deliver measured amounts of zinc dust to the cone 37, where it is mixed with mill water or barren solution from the steady head tank 36. Delivery of this mixture or zinc emulsion through pipe 39 to the solution flow line 33, can be controlled by a mechanically operated valve means. Thus a reciprocating valve rod 44 carries a collar or valve member 44a, cooperating with the valve seat 44b. The upper end of the valve rod is shown associated with a continuously operating camming means 45, such as a tappet 45a, periodically engaged by a rotating cam 45b, whereby the rod 44 is periodically raised to admit predetermined amounts of zinc emulsion to the flow line 33. Additional reagents to promote precipitation can be introduced into the solution together with the zinc dust, as for example a suitable soluble lead salt, like lead nitrate. Such reagents can be similarly introduced into the steady head tank 36.

The type of precipitating filter 12 illustrated is of the bag type, being provided with individual filter bags 46, which can be individually disconnected and removed with respect to the manifold 47. One portion of the filter tank provides an effluent overflow compartment 49, which is connected to the barren solution pump 50. The discharge side of this pump connects to the line 51, to return the barren solution for re-use. A control valve 52 is inserted in this discharge line, and this valve is automatically operated by the float 54. The operation is such that when the level of barren solution in compartment 49 drops, valve 52 is moved towards closed position, to reduce the flow rate from pump 50.

Operation and use of the apparatus described above, can be outlined as follows: Assuming that continuous flow of cyanide solution has been established through the several pieces of equipment, the pregnant solution delivered to the clarifying filter 10 is clarified, and the fresh clarified solution is immediately delivered to the deaerating receiver 11, where dissolved oxygen is removed. The deaerated solution is withdrawn through pipe 33, zinc emulsion introduced into the same from cone 37, and then this mixture is delivered by pump 34 through flow line 35, to the precipitating filter 12. The solution flow through the system is continuous over relatively long operating periods. During a period of operation the filter leaves of the clarifying filter 10, will require cleaning or replacement. To remove one or more filter leaves, both corresponding valves 18a and 19a are closed to disconnect that particular leaf with respect to both the manifolds 18 and 19. Pipe 26 is then disconnected, and the filter leaf removed and the accumulated cake washed off. Upon re-positioning the filter leaf in the tank 13 and before the filter leaf is again connected to the manifold 18, it is first subjected to a conditioning operation. This is carried out by placing pump 23 in operation, and by connecting pipe 26 with the manifold 19. Under such conditions pump 23 draws solution from the filter leaf, but returns this solution directly to the clarifying filter tank, through pipe 24. While recirculating the solution in this manner, a suitable filter aid, such as a slurry or kieselguhr and water, can be introduced into the region of the filter leaf being conditioned, so that the kieselguhr will be deposited upon the filter cloth. After the filter leaf has been properly conditioned, it is again connected to the manifold 18 and deaerating receiver 11. During periods when pump 23 is not operating it is maintained properly primed with clear liquid, because of the connection to tank 27. Also manifold 19 is maintained filled with liquid, because it is on a level below the level of liquid in tank 27.

It will be evident that with this arrangement new or washed filter leaves can be conditioned without in any way interrupting normal operation of the clarifying filter, or without affecting the nature of the clarified solution being delivered to the deaerating receiver. Thus the arrangement insures continued and uninterrupted delivery of a sparkling filtrate to the deaerating receiver 11, such as is conducive to efficient and economical precipitation. The arrangement also makes possible individual testing of a filter leaf to determine if it may have developed a leak, or in general to determine if it is functioning properly. Such testing is carried out by connecting a filter leaf to pump 23 and by observing the discharge from this pump. Should the discharge from the pump be cloudy, a leak is indicated.

Reference has been made to the steady head tank 36, used in conjunction with the zinc emulsion cone 37. The purpose of this steady head tank is to automatically maintain a level of solution in the emulsion cone 37, irrespective of the level at which this cone may be positioned with respect to the precipitating filter 12. Thus the zinc emulsion cone can be installed at any convenient level, dependent upon conditions in particular mill installations.

The arrangement described for maintaining a level of solution in the overflow compartment 49, of the precipitating filter 12, is advantageous in that it prevents the pump 50 from emptying the compartment 49, and thus losing its suction. In other words, it makes possible continuous operation of pump 50, even though the solution flow to the precipitating filter may vary.

The arrangement described above for individually conditioning a filter leaf with kieselguhr, has the disadvantage that an operator may experience difficulty in securing uniform application of the kieselguhr over all portions of the filter leaf. Better conditioning, together with other advantages, can be had by utilizing the modification illustrated in Fig. 3. In this instance three-way valves 56, have been substituted in place of the separate valves 18a and 19a. In conjunction with the clarifying filter tank 13, there is a separate receptacle 57, which is supplied with cyanide solution from a suitable source, such as a pipe line 59 which connects to the tank 13. Suitable agitating means is provided within the receptacle 57, such as a pipe 60 connected to a source of compressed air, and having its lower portion arranged to inject air into the solution. The receptacle 57 is of such size as to conveniently receive a filter leaf 17. While carrying out the method to be presently explained, this filter leaf is connected to the manifold 19 by means of a hose 61.

In addition to the priming connection 29 between the pump discharge line 24 and tank 27, an additional pipe connection 62 is provided between tank 27 and the pump suction line 22. Connection 62 can be controlled by valve 63.

Use of the apparatus illustrated in Fig. 3, can be outlined as follows: When a filter cake has accumulated upon a filter leaf to such an extent as to warrant cleaning, the associated valve 56 is turned to disconnect that leaf with respect to both manifolds 18 and 19, and the filter leaf is then uncoupled and removed. After the cake has been removed by suitable means, the filter leaf is inserted into receptacle 57, and a connection is established by hose 61 to the manifold 19. Pump 23 is started in operation, whereby solution is drawn through the filter leaf, and discharged back into the filter tank 13. A suitable amount of kieselguhr is provided in the receptacle 57, and the kieselguhr is maintained in a state of suspension, by introducing air through pipe 60. Before attempting removal of the conditioned filter leaf from the recetacle 57, the operator makes certain that valve 63 in pipe line 62 is partly open, so that some clear solution flows directly from tank 27 to the inflow side of the pump 23. Now as the operator raises the filter element from the receptacle 57, further flow of solution through hose 61 is discontinued because of the bleeding in of air, but pump 23 continues to function as a combined liquid and air pump, to apply a partial vacuum upon the filter leaf, as indicated by a vacuum gauge 64. In other words as the filter leaf is exposed to the air following conditioning with kieselguhr, and while it is being transferred to the tank 13, the pump 23 is continuously sucking air from the atmosphere into the filter element and through the hose 61. The differential pressure thus imposed upon the filter element is sufficient to prevent disturbance of the coating of kieselguhr, while the filter element is being transferred from the receptacle back to the filter tank.

After the conditioned filter element has been repositioned in tank 13, and reconnected to its valve 56, it is first connected to manifold 19, to enable pump 23 to recirculate solution through the filter leaf for a limited period, whereby the operator may be assured that the filter leaf is functioning properly. Thereafter the three-way valve 56 is turned to discontinue communication with manifold 19, and to establish normal operating communication with manifold 18.

As previously pointed out pipe connection 29 serves the purpose of insuring proper priming of the pump 23 at all times. The apparatus of Fig. 3 can also be used to test any one filter leaf for leaks, without interrupting operation of the remaining filter leaves. During such testing valve 63 should be closed to avoid any unnecessary pumping of liquid from tank 27.

Subject matter disclosed but not claimed herein is being disclosed and claimed in our co-pending application Serial No. 153,214, filed July 12, 1937, and entitled "Cyanidation method and apparatus."

We claim:

1. In apparatus of the character described, for the treatment and precipitation of cyanide solution containing dissolved precious metal values, a solution clarifying filter comprising a solution tank and a plurality of separate filter leaves disposed within said tank, a pair of manifold pipes, valve means serving to connect said filter leaves to said manifold pipes, whereby any one filter leaf can be connected to either one of said manifold pipes, or communication interrupted with respect to both said pipes, means for withdrawing clarified effluent from one of said manifold pipes, and a solution pump having its inlet connected to the other end of said manifold pipes and having its outlet connected to deliver solution back into the filter tank.

2. In apparatus of the character described, for the treatment and precipitation of cyanide solution containing dissolved precious metal values, a clarifying filter comprising a solution tank and a plurality of separate filter leaves disposed within said tank, a pair of manifold pipes, valve means serving to connect the filter leaves to said manifold pipes, said valve means permitting communication between each filter leaf and either one of said manifold pipes, and also enabling interruption of communication between each filter leaf and both of said manifold pipes, means for withdrawing clarified effluent from one of said manifold pipes, a pump having its inlet connected to the other manifold pipe and having its discharge leading back into the tank of the filter, a separate solution receptacle adapted to receive a filter leaf for a conditioning operation, means forming a solution connection between said receptacle and the tank of the filter, whereby sufficient solution is maintained in said receptacle to immerse an individual filter leaf, means forming a flexible connection between such individual filter leaf and said other manifold pipe, and an additional connection for bleeding solution from the tank of the filter into the inlet of said pump, whereby said pump may function to apply either a pneumatic or hydraulic suction upon said individual filter leaf.

3. In apparatus of the character described, for the treatment and precipitation of cyanide solution containing dissolved precious metal values, a clarifying filter comprising a solution tank and a plurality of separately removable filter leaves disposed within said tank, means for withdrawing clarified effluent from all of said filter leaves, a solution pump, means for connecting any individual leaf to the suction side of the pump for individual conditioning of the same, and means for maintaining said pump primed with clear solution.

4. In apparatus of the character described, for the treatment and precipitation of cyanide solution containing dissolved precious metal values, a clarifying filter comprising a solution tank and a plurality of separately removable filter leaves disposed within said tank, means for withdrawing clarified effluent from all of said filter leaves, a solution pump, means for connecting any individual leaf to the suction side of the pump for individual conditioning of the same, and means for supplying a limited flow of clear solution to the suction side of the pump, in addition to solution which the pump may withdraw from the filter leaf, whereby the pump serves to apply a partial vacuum to the filter leaf when a filter leaf is exposed to the atmosphere.

5. In apparatus of the character described, for the treatment and precipitation of cyanide solution containing dissolved precious metal values, a clarifying filter comprising a solution tank and a plurality of separately removable filter leaves disposed within said tank, means for withdrawing clarified effluent from all of said filter leaves, a solution pump, means for connecting any individual leaf to the suction side of the pump for individual conditioning of the same, means for maintaining said pump primed with clear solution, and means for supplying a limited flow of clear solution to the suction side of the pump, in addition to solution which the pump may withdraw from the filter leaf, whereby the pump serves to apply a partial vacuum to the filter leaf when a filter leaf is exposed to the atmosphere.

6. In apparatus of the character described for the handling and precipitation of cyanide solution containing dissolved precious metal values, a solution clarifying filter of the vacuum type comprising a solution tank and a plurality of vacuum filter leaves disposed within said tank, a deaerating receiver for removing dissolved oxygen from the solution, a solution pump having a discharge line leading back to the tank of the clarifying filter, a pair of manifold pipes, one connected to the deaerating receiver and the second connected to the inlet side of said pump, and a plurality of three-way valves, each three-way valve having a connection to a corresponding filter leaf and also having connections to said manifolds, whereby by manipulation of a three-way valve filter leaves can be disconnected with respect to both said manifolds to enable its removal, a washed filter leaf after introduction into the clarifying filter can be connected to the second manifold to enable solution withdrawn from the same to be directly returned to the filter tank, and whereby after individual conditioning of the filter leaf the same can be connected to the first manifold for normal operation with delivery of effluent to the deaerating receiver.

7. In apparatus of the character described making use of a clarifying filter, a deaerating receiver and a precipitating filter, through which alkaline cyanide solution containing dissolved precious metal values is caused to flow successively, a zinc emulsion cone connected to deliver zinc emulsion into the stream of solution flowing from the deaerating receiver to the precipitating filter, a steady head tank connected for gravity flow of liquid from the same to the zinc emulsion cone, means for maintaining a predetermined level of liquid in the steady head tank, whereby a like liquid level is maintained in the emulsion cone, and periodically operating valve means for controlling admission of emulsion from the cone into the cyanide solution, irrespective of the level of solution in the cone.

8. In apparatus of the character described making use of a clarifying filter, a deaerating receiver, and a preciptating filter, through which alkaline cyanide solution containing dissolved precious metal values is caused to flow successively, the precipitating filter being of the bag type having an overflow compartment for barren solution, means for effecting controlled removal of barren solution from the overflow compartment comprising a centrifugal pump having its inlet side connected to the overflow compartment and having a discharge line, a valve interposed in the discharge line, and a float in the compartment mechanically connected to control the setting of said valve, whereby as the solution level in the overflow compartment lowers, said valve is moved towards closed position.

LOUIS D. MILLS.
THOMAS B. CROWE.